UNITED STATES PATENT OFFICE.

HARMON HIBBARD, OF HENRIETTA, ASSIGNOR TO W. W. REID, OF ROCHESTER, NEW YORK.

IMPROVEMENT IN TANNING LEATHER BY TANNIN AND ACIDS.

Specification forming part of Letters Patent No. 6,790, dated October 16, 1849; Reissue No. 189, dated February 11, 1851.

*To all whom it may concern:*

Be it known that I, WILLIAM W. REID, of the city of Rochester, in the county of Monroe and State of New York, assignee of Letters Patent of the United States granted to HARMON HIBBARD, of the town of Henrietta, in the county and State aforesaid, for certain Improvements in Tanning by Tannin and Acids, which Letters Patent, bearing date the 16th day of October, 1849, were assigned to me on the 23d day of October, of the same year, by deed, which deed was duly recorded on the 24th of November, year aforesaid, believing that said Letters Patent are inoperative and invalid by reason of a defective specification, have surrendered the same, and, according to the requirements of the acts of Congress in such case made and provided, have applied for a reissue of Letters Patent for the same improvements under the specification of the words following, viz:

The invention and discovery of HARMON HIBBARD consists in new and useful improvements in the preparing of hides and skins for tanning, and in the art or mode of tanning the same, with or without the hair or wool upon them, thereby making leather suitable for the various purposes to which hides and skins thus tanned may be applied.

First, the nature of his invention, so far as it relates to the preparation of hides and skins for tanning, consists in the use of a composition of lime, wood-ashes or potash, and salt, for the purpose of removing hair or wool, and also for the process of "liming," so called, instead of using lime alone, as in the old method. Lime and ashes or potash, and even salt in weak solution, have been used separately for the purpose of removing hair and wool, also for the process called "liming"—that is, for removing grease, mucus, and other impurities from hides and skins, but not as above combined. It requires several days, and sometimes weeks, to effect these several objects by the use of lime alone. Moreover, lime being nearly insoluble, the hides become impregnated therewith, so that bates and drenches and much labor are required to remove it before the hides are in a suitable condition to receive the tannin, in consequence of which their muscular fiber and texture are materially injured; but potash, being very soluble, is easily washed or worked out by water alone; besides it has a greater affinity for fat or oil, and makes a soluble soap, which also is easily worked out; but lime makes an insoluble soap, which is removed with more difficulty. Potash, being soluble, penetrates and softens the hide more speedily, and thus enables the lime itself to act sooner than it could alone; but fresh quicklime loosens hair sooner than potash. Thus the two conjoined subserve a better purpose than either singly. Salt in solution also aids in softening dry or hard hides. It protects the substance of the hide from the too caustic action of the alkalies, loosens dirt, grease, &c., and thereby purifies the skin. It might be omitted in treating salted hides, unless soaked too long in water; but in all cases it preserves the substance and weight of the hides while undergoing the liming process.

The nature of HIBBARD'S invention, so far as relates to the process of tanning, consists in the use of a composition of salt, sulphuric acid, and sumac, oak, hemlock bark, or any other tannin used for tanning. The salt, sulphuric acid, and tannin being mixed together in water, in certain proportions hereinafter mentioned, a portion of the salt is decomposed by the sulphuric acid, forming sulphate of soda and setting muriatic acid free, which, (the muriatic acid,) being absorbed by the water, acts directly and rapidly on whatever of the alkalies may yet remain in the skins, dissolving and removing them, while it acts with equal rapidity on the hide itself, "raising" it or opening its pores, prepares it to receive the tannin, which, being present also in the mixture, immediately unites with the gelatine of the hide, forming leather more expeditiously than by the old method.

To enable others skilled in the art of tanning to use this method, let them observe the following: For "unhairing and liming," so called, and for pulling wool, prepare and use the following composition, which I denominate "Composition No. 1:" good wood-ashes, one bushel, (or potash about five pounds;) fresh-slaked lime, four quarts; salt, about three quarts; water, about one hundred gallons.

These ingredients may be mixed together and the hides be put into the mixture for unhairing and liming; but for pulling wool, take lime and ashes, equal parts, and salt, one quart to one bushel of the mixture, and mix with water sufficient to make a thin paste, which is to be applied to the flesh sides of the skins in the usual way, and kept at a temperature of 60° to 68° Fahrenheit; or a better method may be to bleach the ashes, or, when potash is used, to dissolve it in the water. To the clear lye add the lime and salt, and use this mixture for unhairing and liming; but for pulling wool mix one bushel of lime and one quart of salt with good strong lye, making a thin paste, which apply to the flesh sides of the skins, as already described. A little practice will enable the operator to judge of the proper strength of composition No. 1. It should have a slippery feel and quite a sharp alkaline taste. It is readily made stronger by addition of more material, or weaker by adding water. The above quantities and proportions serve as a general guide. The lime and ashes or potash may be used in various proportions; but it is desirable that as little lime as possible to produce the desired effect should be used, because of its insolubility and of its insinuating itself into the substance of the hide. The hides or skins, having been properly soaked, softened, and "broken," are to be put into composition No. 1 in a vat or vats, and handled in the usual way. The temperature may be kept at 50° to 60° Fahrenheit. As soon as the hair will come freely, they must be taken out and put into clean, warm, soft water and soaked several hours, then thoroughly worked, flesh and grain, on the beam, then put back into the water, soaked again, and worked again till they are sufficiently "reduced." They are then ready for the tanning process. As a general thing, bates and drenches will not be required, because the potash, being soluble, and the little lime used are easily washed out with water, and because composition No. 2, about to be described, used in the tanning accomplishes the identical objects to be obtained by bating and drenching. If any prefer, they may prepare their hides and skins after the old method. They can be tanned just as well by composition No. 2; but skins and hides prepared by the foregoing method will make heavier and stronger leather than when prepared by the old process of liming and bating.

For tanning, make and use the following, which I denominate "Composition No. 2:" Take sumac, oak-bark, quercitron, or any other tanning materials, either singly or combined. Bleach and make a strong infusion or ooze. To every one hundred gallons of ooze, add salt, twenty pounds, sulphuric acid, two pints. These quantities serve as a general rule. A little experience will enable a workman to determine by the color and taste as to the requisite proportions and quantities and strength of the composition without weighing or measuring. The salt should always be in excess over the acid. If it is considerably more so, no harm can accrue; but if the acid should be in excess, injury might be done. There should be sulphuric acid enough to decompose enough of the salt to liberate an equivalent of muriatic acid, of which there should be so much as is sufficient to give the hides a uniform color and cause them to swell or puff up slightly. The muriatic acid thus generated by the decomposition of the salt, by means of the sulphuric acid, attacks the alkalies that may remain in the hides, dissolves or converts them into soluble muriates of lime or potash, and thus acts as a bate and drench on the hides to clean them, while at the same time it opens their pores, so that they imbibe the tannin more rapidly. It also precipitates or decomposes a portion of the coloring-matter of the ooze, and thereby renders the color of the leather lighter, more lively and beautiful. If there is a deficiency of acid, so as not to neutralize all the alkalies remaining in the hides, they will be spotted or dark colored. They will not raise or swell up. In such case more of the sulphuric acid must be added for the purpose of decomposing more of the salt, (which is supposed to be in excess,) and thus furnish more of the muriatic acid.

Muriatic acid of commerce may be added to the tannin and salt, and they will produce nearly the same result. The sulphate of soda would be wanting; but this also may be added, and then we should have the same composition and precisely the same results, and when economy would warrant it, this course might be adopted; but at present cost of these materials it is cheaper to use sulphuric acid and salt, and thus generate both the muriatic acid and sulphate of soda. This method is also more simple.

The hides and skins having been prepared in composition No. 1, as already described, they are then to be put into composition No. 2, prepared as above, in suitable vats and handled often in the usual way. The strength of the composition must be kept up by additions of strong ooze, and also of salt and acid when necessary, and in such quantities as will give the original taste, color, &c.

The time required to accomplish the process of tanning will depend on the quality and size of the hides or skins or kinds of leather to be made, and on the strength and temperature of the composition. If the strength be good, the temperature about 80° Fahrenheit, and the handling properly conducted, most kinds of leather may be tanned in less than half the time required by the old method of tanning now in use in our country. When the hides are sufficiently tanned, those designed to be curried may be curried and finished in the usual way. If the process has been properly conducted, they will require much less scouring, whereby some hard labor is saved.

When it is intended to black and finish on the grain, in order to remove any excess of salt and acid that may remain in them and interfere with the finishing, after removing them from the vats soak them one hour or less in a clear ooze made of the same kind of tannin used in tanning them, then rinse and strike them out of clean soft water, after which immerse them in the following composition: To every gallon of soft water add of good soft soap one quart; best sperm or cod oil, one pint. Mix and beat these ingredients well together. After being dipped in this mixture let them sammy or dry partially, then shave, set, and stuff them. For stuffing use common stuffing and soft soap, equal parts, or sad and cod oil, equal parts, after which, if to be finished on the flesh side, proceed in the usual way; but if to be blacked on the grain, wet or sponge them when nearly dry on the grain side with a weak solution of potash or sal-soda, then apply a thin coat of blood and acetate of iron as used by morocco-dressers. Let them nearly dry, then repeat the coat of sal-soda and mixture of blood and acetate of iron, then set them smooth on both sides, oil and dry them.

Deer, sheep, and similar skins designed for buck or imitation of buck—such as are used for gloves, mittens, and military trimmings—should be "frized" after being prepared in composition No. 1, and unhaired and then tanned in composition No. 2, prepared with sumac. When tanned, rinse and strike them out of clean soft water, then hang up to dry. When dry, finish on a perch with a stake, moon-knife, and pumice-stone; or, to make them soft and elastic, they may be milled first, before quite dry, and then finished with perch, moon-knife, &c., the same as in oil-dressing, but without any oil.

In order to tan hides or skins with fur, hair, or wool on, they must first be washed thoroughly clean in a weak potash lye or in soft soap and water, (care being taken not to keep them in so long as to start or loosen the fur, &c.,) then flesh and break them, rinse in clean soft water, then tan them in composition No. 2.

To make white leather sumac should be used in making composition No. 2.

What I claim, and desire to secure by Letters Patent, is—

1. The process of removing hair and wool from hides and skins and of "liming" them, so called, preparatory of tanning, by the use of a composition of lime, wood-ashes or potash, and of salt, called "Composition No. 1," in the manner above described.

2. The use of a composition of lime and wood-ashes or potash without the salt; but I do not claim either of these materials separately by itself.

3. The process of tanning hides and skins by the use of any kind of tannin, in combination either with the muriatic acid of commerce or with muriatic acid generated by a mixture of sulphuric acid and salt in water with the tannin, in the manner substantially as above described.

W. W. REID.

Witnesses:
DANIEL LEE,
PETER C. HOWLE.